United States Patent
Adams et al.

(10) Patent No.: US 10,901,817 B1
(45) Date of Patent: Jan. 26, 2021

(54) SYSTEMS AND METHODS FOR PROCESSING ELECTRONIC REQUESTS

(71) Applicant: MASSACHUSETTS MUTUAL LIFE INSURANCE COMPANY, Springfield, MA (US)

(72) Inventors: Lucas Adams, Springfield, MA (US); Jonathan Ellenberger, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 16/796,877

(22) Filed: Feb. 20, 2020

(51) Int. Cl.
*G06F 9/54* (2006.01)
*H04L 29/06* (2006.01)
*G06N 5/04* (2006.01)
*G06N 20/00* (2019.01)

(52) U.S. Cl.
CPC .............. *G06F 9/545* (2013.01); *G06F 9/547* (2013.01); *G06N 5/04* (2013.01); *H04L 63/08* (2013.01); *G06N 20/00* (2019.01); *H04L 2463/082* (2013.01)

(58) Field of Classification Search
CPC ............. G06F 9/54; G06F 9/541; G06F 9/547
See application file for complete search history.

(56) References Cited

U.S. PATENT DOCUMENTS

| | | | | |
|---|---|---|---|---|
| 2016/0147578 | A1* | 5/2016 | Biesack | H04L 67/02 719/328 |
| 2019/0042289 | A1* | 2/2019 | Bailey | G06N 20/20 |
| 2019/0303408 | A1* | 10/2019 | Park | B63B 71/00 |
| 2020/0210258 | A1* | 7/2020 | Cramer | G06F 9/547 |

* cited by examiner

*Primary Examiner* — Brian W Wathen
(74) *Attorney, Agent, or Firm* — Foley & Lardner LLP

(57) ABSTRACT

Disclosed herein are embodiments of systems, methods, and products comprises a server for efficiently processing electronic requests. The server receives a plurality of predictive computer models and a specification file for each model for registration. The server extracts validation codes for each model based on the specification file. When the server receives an electronic request, the API layer of the server validates the request by verifying the inputs of the request satisfying the validation codes of the corresponding model. If the electronic request is invalid, the server returns an error message immediately; otherwise, the API layer of the server sends the electronic request to the model execution layer. Within the model execution layer, the server executes the corresponding model based on the request inputs and generates output results. The model execution layer transmits the output results back to the API layer, which transmits the output results to the user device.

20 Claims, 3 Drawing Sheets

SYSTEMS AND METHODS FOR PROCESSING ELECTRONIC REQUESTS

TECHNICAL FIELD

This application relates generally to methods, systems, and a system architecture for processing electronic requests.

BACKGROUND

As the processing power of computers allows for greater computer functionality and the Internet technology era allows for interconnectivity between computing systems, many existing software solutions receive a high volume of electronic requests. To satisfy the electronic requests, the sever receiving the requests may need to execute different predictive computer models for different requests. Managing such electronic requests in a reliable and efficient manner is difficult.

In existing and conventional software solutions, after the server receives the electronic requests, an API (application programming interface) layer of the server may identify the requested predictive computer models, and load the models from memory. If the models are not in local memory, the API layer of the server may load them into memory from a cross-platform database (e.g., MONGODB). The API layer may also convert the inputs into a data frame and pass the inputs to the models for execution. As a result, the conventional software solutions perform the receiving and processing of the requests, and loading and execution of the models in the same environment.

Existing software solutions, utilizing conventional methods, have encountered a new set of technical challenges. First, existing and conventional software solutions may have consistent failures because of invalid inputs. The conventional software solutions may put the responsibility of knowing how to send right requests on the users. If the users send an invalid request, the system may crash. Specifically, invalid input may lead to segment faults and system crash. A segmentation fault or access violation is a fault, or failure condition, raised by hardware with memory protection, notifying an operating system the software has attempted to access a restricted area of memory. The segment faults may lead to memory dump, which is a process of recording the state of the working memory of a computer program at the time of crash. The memory dumps may lead to the next request failing.

Second, existing and conventional software solutions may have intermittent failures due to overloaded resource pool. All the models share the same environment and the same pool of resources, which may lead to system crashes and slow downs. In conventional software solutions, only one predictive computer model runs at a time, which may monopolize the CPU (central processing unit) of the server. Furthermore, because the API layer may load the models from a cross-platform database if the models are not in memory, it may take a long duration for satisfying the requests. The timeouts from long-duration requests may cause low efficiency, especially when low-priority batch predictions may monopolize the resources.

Third, existing and conventional software solutions have a single predictive model environment and share the same kind of third-party dependencies. The incrementing third party dependencies may cause inflexibility. For example, upgrading for one model may lead to breaking the functionality for another.

SUMMARY

For the aforementioned reasons, what is needed is a system and method to execute different predictive computer models not only at scale, but also with a short response time. What is further needed is a system and method to validate requests before executing the models. What is also needed is a new system architecture that separates the API layer and the model execution layer and executes each model in an individual environment/container without third-party dependencies.

Embodiments disclosed herein address the above challenges by providing a system and method for efficiently processing electronic requests. Specifically, an analytic server may have a plurality of predictive computer models registered on a model-by-model basis. The analytic server may receive a model specification file for each model that defines the expected inputs and other description of the model. Based on the model specification file, the analytic server may extract a set of validation codes for each model. When the analytic server receives an electronic request to execute one of the predictive computer models, the API layer of the analytic server may validate the electronic request by verifying the inputs of the request satisfying the set validation codes of the corresponding model. If the electronic request is invalid, the analytic server may return an error message immediately with helpful information to the user. If the electronic request is valid, the API layer of analytic server may send the electronic request to predictive model execution layer. Within the predictive model execution layer, the analytic server may execute the corresponding model based on the request inputs and generate output results. The predictive model execution layer may transmit the output results back to the API layer, which may transmit the output results to the user device.

The API layer may perform the input validation to make sure that only valid requests are processed. The invalid requests are filtered out and will not cause system crash. The analytic server may separate the predictive model execution layer from the API layer and allocate system resources based on per-model request volume. Within the predictive model execution layer, each predictive computer model may reside in its own separate, containerized environment. This per-model containerized architecture may enable efficient resource allocation and per-model dependency management. For example, each model may be scaled and load balanced independently. Multiple models may execute at the same time. Each model may have their own set of third-party libraries. So that each model can leverage whatever version of R/Python (and any associated third-party dependencies) they require without breaking the functionality of any other registered model.

In one embodiment, a method comprises receiving, by a server, a plurality of predictive computer models, each predictive computer model comprising a model specification file indicating a set of validation codes comprising at least a required input range and type to execute the predictive computer model; receiving, by an application programming interface layer of the server, from an electronic device, an electronic request to execute a predictive computer model within the plurality of predictive computer models using a set of inputs; identifying, by the application programming interface layer of the server, a first predictive computer model corresponding to the received electronic request; validating, by the server, in the application programming interface layer, the electronic request by verifying that the set of inputs corresponds to the required input range and type in the set of validation codes of the first predictive computer model; in response to the set of inputs corresponding to the required input range and type in the set of validation codes of the first predictive computer model: executing, by a model execution layer of the server, the first predictive computer model using the set of inputs to generate output results; and transmitting, by the model execution layer of the server, the generated output results to the application programming interface layer of the server, whereby the application programming interface layer of the server transmits the generated output results to the electronic device.

In another embodiment, a computer system comprises an electronic device, a server in communication with the electronic device and configured to: receive a plurality of predictive computer models, each predictive computer model comprising a model specification file indicating a set of validation codes comprising at least a required input range and type to execute the predictive computer model; receive, by an application programming interface layer of the server, from the electronic device, an electronic request to execute a predictive computer model within the plurality of predictive computer models using a set of inputs; identify, by the application programming interface layer of the server, a first predictive computer model corresponding to the received electronic request; validate, in the application programming interface layer, the electronic request by verifying that the set of inputs corresponds to the required input range and type in the set of validation codes of the first predictive computer model; in response to the set of inputs corresponding to the required input range and type in the set of validation codes of the first predictive computer model: execute, by a model execution layer of the server, the first predictive computer model using the set of inputs to generate output results; and transmit, by the model execution layer of the server, the generated output results to the application programming interface layer of the server, whereby the application programming interface layer of the server transmits the generated output results to the electronic device.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
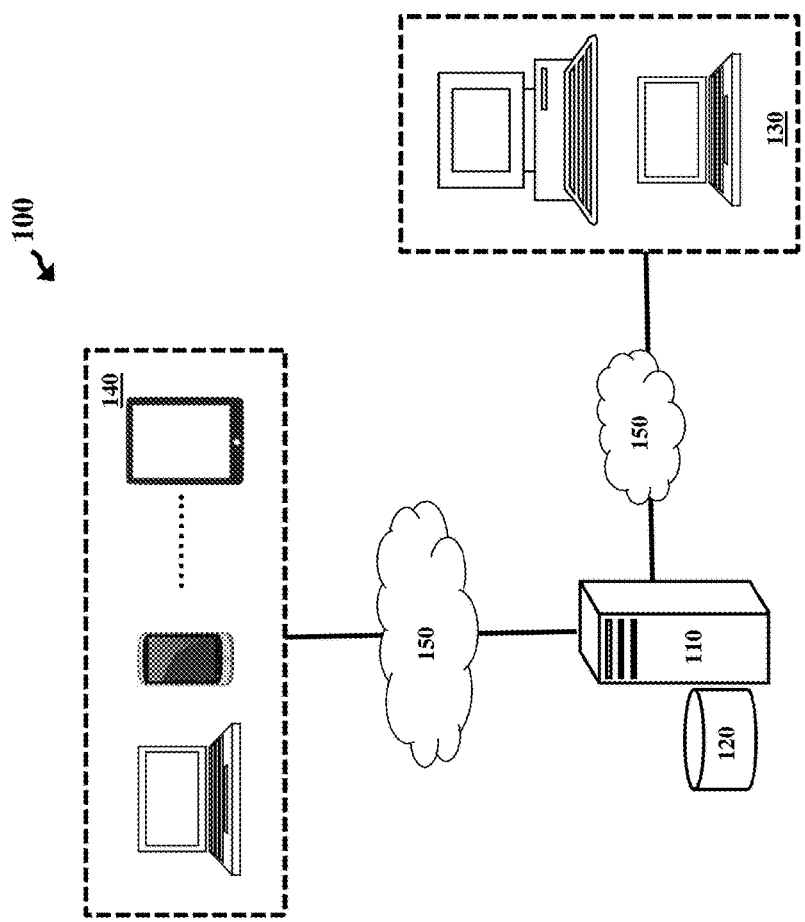
FIG. 1 illustrates a computer system for processing electronic requests, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for efficiently processing electronic requests by executing different predictive computer models. An analytic server may register the predictive computer models on a model-by-model basis. Specifically, data scientists may develop a plurality of predictive computer models for different services using any programming language of their skill sets. The data scientists may use a template to generate a model specification file for each model. The model specification file may define the expected inputs, the expected outputs, and the model's purpose. The data scientists may register these predictive computer models at the analytic server. The analytic server may have each model in an individual container. As a result, each model may execute individually. Multiple models may execute at the same time, with each model as a low balance circuit.

The analytic server may validate the electronic requests based on a set of validation codes corresponding to the expected inputs included in the model specification files. If a user sends a wrong request, the API layer of the analytic server may determine that the wrong request does not pass the validation and return an error message to the user. By filtering out invalid electronic requests, which may cause system crash, the analytic server may provide more robust services.

The analytic server may execute the predictive computer models in a different layer than the API layer. Specifically, the analytic server may have two layers: the API layer and the predictive model execution layer. The API layer may receive and process the electronic requests from users, and perform the input validation. If the electronic request pass the validation, the API layer may send the electronic requests to the predictive model execution layer. In the predictive model execution layer, the analytic server may execute the different models within load balance environments.

The communication between these two layers may be through a remote procedure call (RPC) protocol. Specifically, each predictive computer model may be placed into a separate DOCKER image, with its own set of dependencies. Each image has an RPC server that receives prediction requests and returns JSON (JavaScript object notation) responses. The API has an RPC client that manages communication with each registered predictive computer models.

Once a predictive computer model containing DOCKER image is built, it may be deployed to KUBERNETES where it becomes a prediction service. KUBERNETES is an open-source container-orchestration system for automating application deployment, scaling, and management. Each service is auto load balanced within KUBERNETES based on CPU usage and can only be reached from the API layer.

FIG. 1 illustrates components of a system 100 for processing electronic requests, according to an embodiment.

The system 100 may comprise an analytic server 110, a database 120, a set of electronic user devices 140, and data scientist computing devices 130 that are connected with each other via hardware and software components of one or more networks 150. Examples of the network 150 include, but are not limited to, Local Area Network (LAN), Wireless Local Area Network (WLAN), Metropolitan Area Network (MAN), Wide Area Network (WAN), and the Internet. The communication over the network 150 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, configured to receive and process electronic requests. The analytic server 110 may be logically and physically organized within the same or different devices or structures, and may be distributed across any number of physical structures and locations (e.g., cabinets, rooms, buildings, cities).

The analytic server 110 may be a computing device comprising a processing unit. The processing unit may include a processor with computer-readable medium, such as a random access memory coupled to the processor. The analytic server 110 may be running algorithms or computer executable program instructions, which may be executed by a single processor or multiple processors in a distributed configuration. The analytic server 110 may be configured to interact with one or more software modules of a same or a different type operating within the system 100.

Non-limiting examples of the processor may include a microprocessor, an application specific integrated circuit, and a field programmable object array, among others. Non-limiting examples of the analytic server 110 may include a server computer, a workstation computer, a tablet device, and a mobile device (e.g., smartphone). Some embodiments may include multiple computing devices functioning as the analytic server 110. Some other embodiments may include a single computing device capable of performing the various tasks described herein.

The analytic server 110 may be connected to the electronic user devices 140 and the data scientist computing devices 130 via the network 150. The analytic server 110 may receive a plurality of electronic requests from a plurality of electronic user devices 140. Users operating the electronic user devices 140 may generate the electronic requests for different prediction services. The analytic server 110 may receive a plurality of predictive computer models from the data scientist computing devices 130. The analytic server may execute the predictive computer models to satisfy the electronic requests.

The set of electronic user devices 140 may be any computing device allowing a user to interact with the analytic server 110. The electronic user devices 140 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 140 may comprise any number of input and output devices supporting various types of data, such as text, image, audio, video, and the like.

A user operating the electronic user device 140 may issue an electronic request for a certain prediction service. For example, a customer or a sales agent may issue a request to determine the customer's mortality score. The electronic request may comprise a set of inputs, such as user age, heart condition, smoking status, and the like. The users may initiate the electronic requests by interacting with a graphical user interface (GUI) provided by the analytic server 110. For example, the users may enter a set of inputs in the GUI and request to execute a predictive computer model based on the set of inputs. The users may initiate the electronic requests through web applications (e.g., comprising a hyperlink of a website) and/or mobile applications installed in the electronic user devices 140. Different users may issue electronic requests for different prediction services. The analytic server 110 may have a plurality of predictive computer models with each predictive computer model providing a different prediction service. The plurality of predictive computer models may be individual models developed by different data scientists.

The data scientist computing device 130 may be any computing device allowing a data scientist to interact with the analytic server 110. The data scientist computing device 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The data scientist computing device 130 may comprise any number of input and output devices supporting various types of data, such as text, image, audio, video, and the like.

Each data scientist may train a predictive computer model for a certain prediction service on the data scientist computing device 130. The data scientist may also create a model specification file to describe the model based on a template provided by the analytic server 110. The model speciation file may include description on the service provided by the model, the expected inputs, the expected outputs, and the like. The data scientist may fill in configuration data for a set of fields in the template to describe the trained model, such as the data types and ranges of the inputs, the expected output, the provided service of the model, and the like.

The analytic server 110 may receive the plurality of predictive computer models and their specification files from the data scientist computing devices 130. The analytic server 110 may register these predictive computer models on a model-by-model basis. The analytic server 110 may create a record for each model and save the models in a database 120.

The database 120 may be any non-transitory machine-readable media configured to store the predictive computer models and their specification files. For example, data in database 120 may comprise the description on the service provided by the model, the input schemas/rules, the expected output, flow pattern description of the model, and any other information about the model. The input schemas/rules may define the data types of the inputs, the ranges of numbers, string lengths of the inputs, and the like. The database 120 may further comprise the electronic requests and the responses to the requests. The database 120 may include any other related data of the predictive computer models. The database 120 may be part of the analytic server 110. The database 120 may be a separate component in communication with the analytic server 110. The database 120 may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions.

The analytic server 110 may extract a set of validation codes for each predictive computer model based on the model specification file. The analytic server may comprise two layers: the API layer and the predictive model execution layer. When the analytic server 110 receives an electronic request from the electronic user device 140, the API layer of the analytic server 110 may validate the electronic request by verifying the inputs of the request satisfying the set validation codes of the corresponding model. If the electronic request is invalid, the analytic server 110 may return an error message immediately with helpful information to the electronic user device 140. If the electronic request is valid, the API layer of analytic server 110 may send the electronic request to predictive model execution layer. Within the predictive model execution layer, the analytic server 110 may call the corresponding model in the database 120 and execute the model based on the request inputs and generate output results. The predictive model execution layer may transmit the output results back to the API layer, which may transmit the output results to the electronic user device 140.

Figure 2:
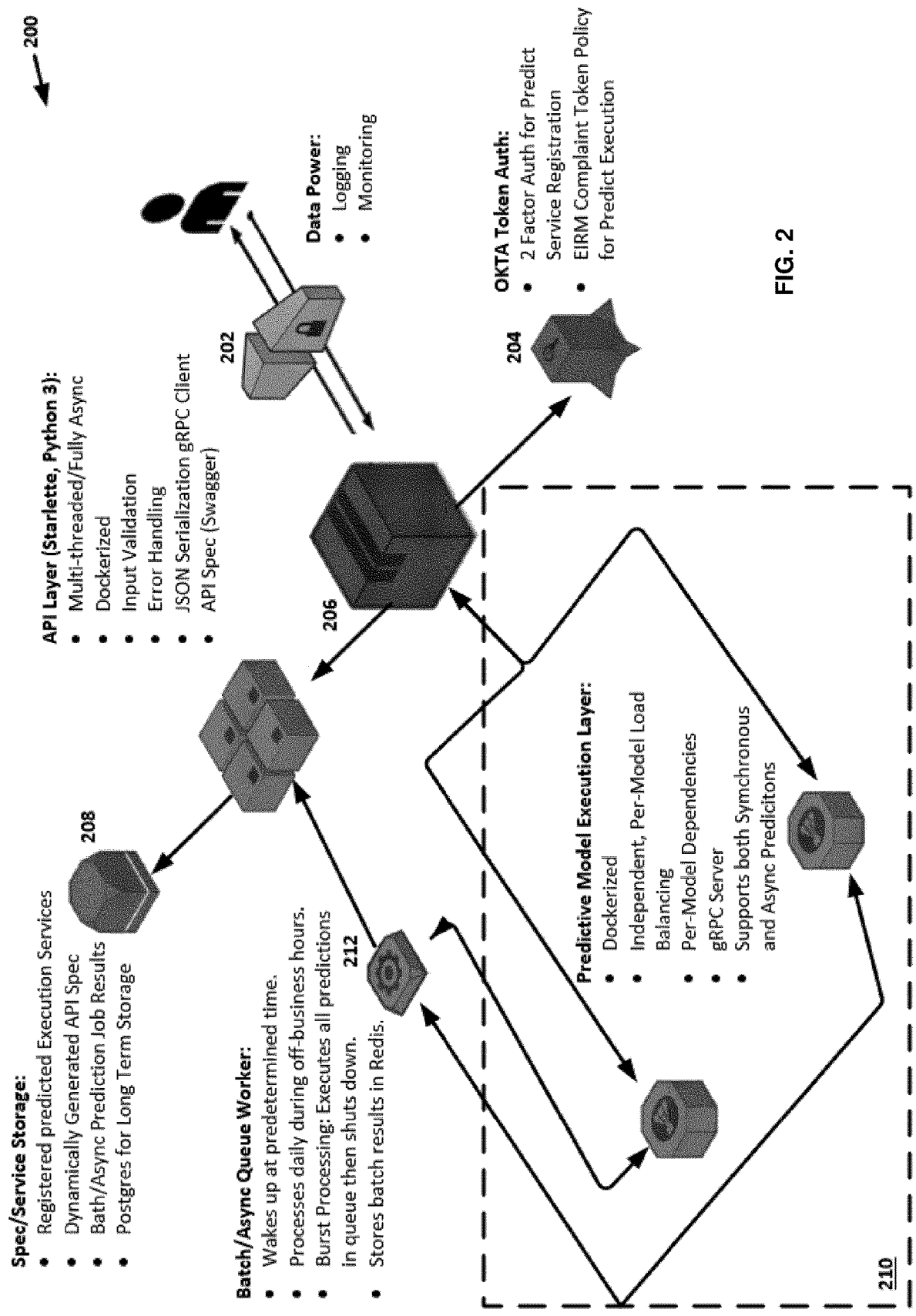
FIG. 2 illustrates components of an analytic server for processing electronic requests, according to an embodiment.

FIG. 2 illustrates components 200 of the analytic server for processing electronic requests, according to an embodiment. The analytic server processing the electronic rquests may comprise the following components: data power 202, token authentication 204, API layer 206, specification and service storage 208, predictive model execution layer 210, and batch/asynchronous queue worker 212.

The data power 202 may be an HTTP (hypertext transfer protocol) gateway that provides security, control, integration, and optimized access for the services connected to it. The analytic server may route all traffic to the API layer 206 through data power 202. The data power 202 may provide two key pieces of functionality: logging and monitoring/alerting. For logging, the data power 202 may provide rich logging of all incoming and outgoing prediction requests. For monitoring/alerting, the data power 202 may have the capability to alert an administrative user immediately of any service interruptions and/or abnormally high latency for prediction requests. This functionality may ensure that the administrative user knows any potential issues and patches them before the issues influence the customers.

The token authentication 204 may provide authentication/authorization for two types of interactions: new predictive computer model upload/registration and prediction requests. In new predictive computer model upload/registration, data scientists looking to upload a new model to process prediction requests may need to log in with their credentials and verify their IDs with two-factor authentication. To issue prediction requests, the users may need a valid OKTA (an identity standard) access token. Access tokens may be granted to the users via client credential authentication flow (e.g., by requiring the users to log in with their credentials or by requiring client ID and its associated secret key).

The API layer 206 may be written in Python and may leverage a lightweight toolkit for building efficient asynchronous web services (e.g., STARLETTE). The API layer 206 may provide the following functionalities: prediction execution service registration, input validation, clean separation, error handling, and SWAGGER specification.

In the prediction execution service registration, data scientists developing the predictive computer models may register their model services by using a model specification file, such as a human-readable data-serialization file (e.g., YAML). The model specification file may define the expected input necessary to make a successful prediction request, the expected output schema of a particular model, the model's purpose and/or service in plain-language. The data scientists may need to verify their IDs with two-factor authentication before they register their models.

In the input validation, the API layer 206 may validate a request before satisfying the request. For example, when the API layer 206 receives a prediction request that requires one of the registered models to execute, the API layer 206 may validate the request inputs against the input schemas specified in the model specification file (e.g., the YAML file used to register the model/service). For invalid request, the API layer 206 may return a 400 BAD REQUEST response with helpful, human-readable error messages in the response.

For the clean separation, the model execution may happen separately from the API layer 206. The model execution are in the predictive model execution layer 210. All communication between the API layer 206 and the predictive model execution layer 210 may be through efficient RPC protocol.

In error handling, the API layer 206 may catch and log any unexpected errors that arise during a prediction. In addition to the input validation, the model specification YAML file may also be used to create a full-featured SWAGGER specification that describes request/response models in addition to all available HTTP (hypertext transfer protocol) interactions supported by the system.

The specification/service storage 208 may comprise a centralized fast, in-memory data store (e.g., REDIS) for the input validation configuration for each registered predictive computer model/service, the SWAGGER specification, a queue for asynchronous batch prediction requests as they await execution as well as the responses to the batch requests. In some embodiments, the specification/service storage 208 may store the data of the in-memory data store in a long-term storage (e.g., POSTGRES) in case the in-memory data store needs to be upgraded or restarted.

In the predictive model execution layer 210, each predictive computer model may reside in its own separate, containerized environment. This per-model containerized architecture may enable efficient resource allocation, per-model dependency management, and unified protocol.

For efficient resource allocation, each predictive computer model may be scaled and/or load balanced independently, enabling more popular models to have the resources they need to appropriately meet demand. The analytic server may allocate resources to the plurality of predictive computer models on a model-by-model basis. For per-model dependency management, each predictive computer model executes within its own DOCKER container so that each model can leverage whatever version of R/Python (and any associated third party dependencies) they require without breaking the functionality of any other registered model. For unified protocol, all requests enter the container and travel back to the API via RPC. RPC supports popular languages so the model execution containers can be in languages besides R and Python.

The batch/asynchronous queue worker 212 may support batch requests with each batch containing dozens of prediction requests. If all predictive computer models for the batch requests run synchronously, the system may quickly overwhelm the limited resources available in the system. The batch/asynchronous queue worker 212 may address this problem by putting the batch requests immediately in an in-memory data structure store (e.g., REDIS) queue, where the batch requests await execution during off-business hours. When a user initiates batch prediction requests, the analytic server may assign each of the batch requests a URL (uniform resource locator) that can be used to check the status of the request, including awaiting execution, execution failed, and execution completed. The analytic server may update the request status in the URL whenever the status changes. During off-business hours or any other appropriate time, a process may wake up to execute the models of the requests in the order the requests were queued. When each job completes, the analytic server may post the results to the URL initially returned to the user (e.g., original requestor) and update the status of the request. The analytic server may customize the flow of the results based on the needs of the users. For example, the analytic server may store these results into another database or email a notification to the user to notify the user that the results are now available.

Figure 3:
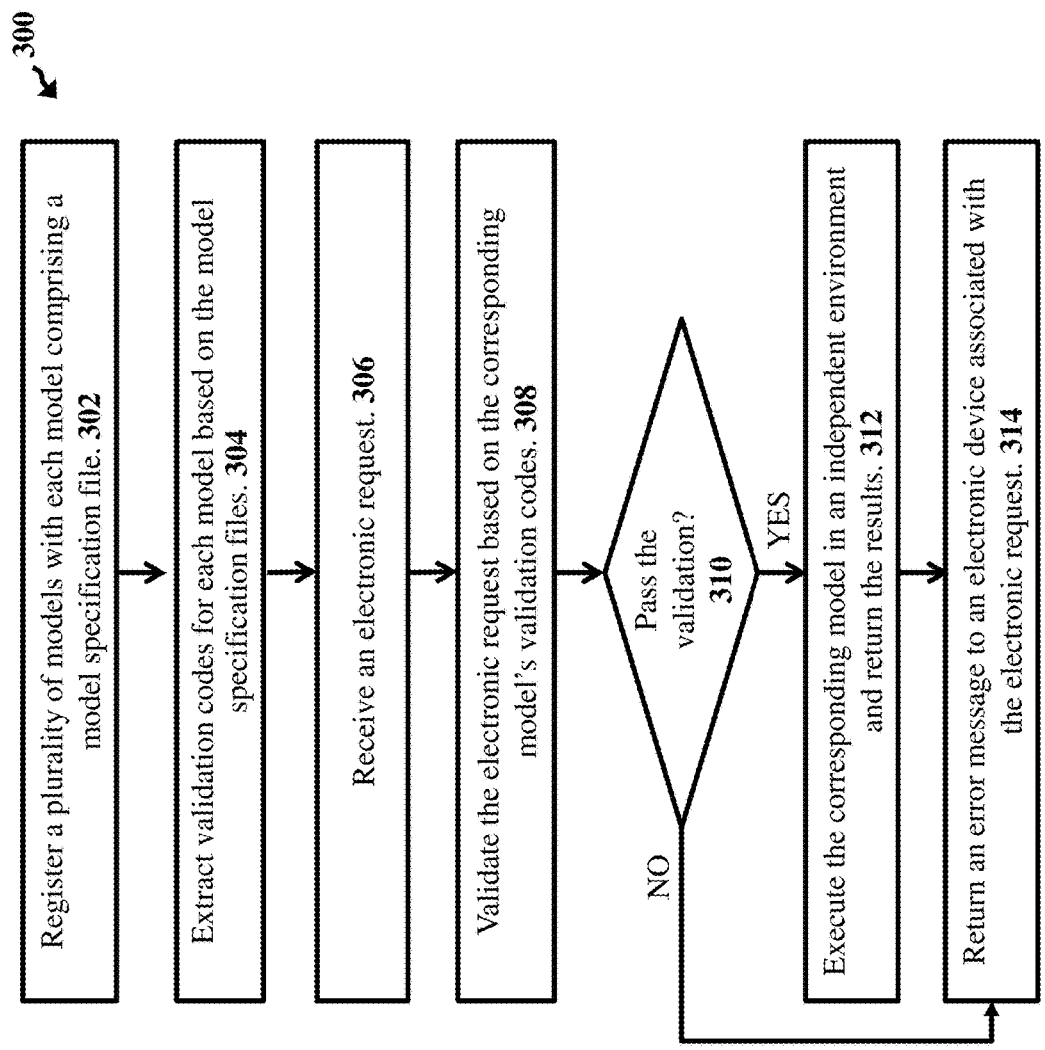
FIG. 3 illustrates a flowchart depicting operational steps for processing electronic requests, according to an embodiment.

FIG. 3 illustrates execution of a method 300 for processing electronic requests, according to an embodiment. Other embodiments may comprise additional or alternative steps, or may omit some steps altogether.

At step 302, the analytic server may receive a plurality of predictive computer models, each predictive computer model comprising a model specification file. Each model specification file may indicate a set of validation codes that comprise at least a required range and type to execute the predictive computer model. Each predictive computer model may provide a different prediction service. The plurality of predictive computer models may be individual models developed by different data scientists.

A data scientist may train a predictive computer model for a certain prediction service. In addition, the data scientist may create a model specification file to describe the model. The speciation file may include description on the service provided by the model, the input schemas/rules, the expected output, flow pattern description of the model, and any other information about the model. The input schemas/rules in the specification file may describe the restrictions of the inputs of the corresponding model. For example, the input rules may define the data types of the inputs, the ranges of numbers, string lengths of the inputs, and the like. Different data scientists may individually develop the plurality of predictive computer models. Different models may be in different programming languages. Different models may be separate from each other.

The analytic server may register these predictive computer models on a model-by-model basis. In the registration process, the analytic server may receive the plurality of predictive computer models and the corresponding model specification files uploaded by the data scientists. For example, the analytic server may provide a GUI with an interactive component such as an upload button. The data scientists may be able to upload the predictive computer models and model specification files by clicking on the upload button. The analytic server may create a record for each model in a database and save the models in a storage device. When the analytic server receives a request, the analytic server may determine and call the appropriate model to satisfy the request. For example, the analytic server may feed the request inputs into the appropriate model, execute the model, and return the output results.

The model specification files may be based on a template. The template may include a set of fields to describe the model, such as the name of the model, the data types of the inputs, number ranges of the inputs, string lengths of the inputs, the data type of the output, the meaning of the output, the provided service of the model, and the like. The data scientists may fill in configuration data for the fields in the template to create a specification file for the trained model. The template may be in a human-readable data-serialization language, such as YAML, which is readable, flexible, and commonly used for configuration files. The template may provide an easy way for every data scientist to write configurations and add more predictive computer models.

At step 304, the analytic server may extract the set of validation codes for each predictive computer model based on the model specification file. As discussed above, each predictive computer model may have a model specification file describing the model, including the input rules for each model. The analytic server may parse the model specification file and extract input validation codes corresponding to the input rules included in the model specification file. The analytic server may extract the validation codes using natural language processing algorithms. The analytic server may use the validation codes to determine whether inputs for a model satisfying the input rules.

For example, a mortality model may accept user age, user heart condition, and user smoking status as inputs to determine the user's probability of dying before a certain age. The specification file of the mortality model may specify that the accepted input type for user age is numeric, the range for the user age is from 18 to 60, the accepted input type for heart condition is string with a maximum string length of 150, and the accepted input type of the smoking status is Boolean (e.g., false or true). The analytic server may parse the specification file and extract such rules as the validation codes for the mortality model.

At step 306, the analytic server may receive an electronic request, in the API layer, to execute a predictive computer model using a set of inputs included in the electronic request. The electronic request may request a certain prediction service that requires a corresponding model to execute based on the set of inputs. The analytic server may identify the predictive computer model corresponding to the received electronic request. For example, a customer or a sales agent may issue a request to determine the customer's mortality score. The electronic request may comprise a set of inputs, such as the user age, heart condition, and the smoking status. The analytic server may receive the request and determine that the corresponding model is the mortality model.

In some embodiments, the analytic server may receive a large number of electronic requests at the same time. The API layer of the analytic server may assign the requests to different predictive computer models. In the registration process, the analytic server may record a set of predictive computer models from different data scientists. When the analytic server receives the electronic requests in API layer, the analytic server may determine, in the API layer, the corresponding models and call the corresponding models.

At step 308, the analytic server may validate the electronic request based on the corresponding model's validation codes. After the analytic server receives the electronic requests in the API layer, the analytic server may assign each electronic request to a corresponding model based on the requested service and the model's registration information. Furthermore, before executing the model, the analytic server may validate the electronic request, in the API layer, by verifying the set of inputs included in the request satisfying the validation codes of the corresponding predictive computer model.

For example, assuming a user issues an electronic request to determine a morality score, the set of the inputs in the electronic request comprise the user age, heart condition, and smoking status. The analytic server may extract the user inputs from the request and compare the inputs against the mortality model's input validation codes. For example, the analytic server may check if the input user age is a number within the range of 18 to 60, if the heart condition is a string with the number of characters less than or equal to 150, and if the smoking status is a Boolean value (e.g., "true" or "false").

By validating the electronic requests, the analytic server may be able to make sure that only valid requests are processed. While there is no validation for the requests and the invalid requests may crash the system in conventional methods, the method and system described herein may provide more robust service by filtering out invalid requests and provide more efficient service by focusing on the valid requests only.

At step 310, the analytic server may determine whether the electronic request passes the validation. The analytic server may determine whether the set of inputs in the electronic request satisfies the validation codes of the corresponding predictive computer model. If the electronic request passes the validation, the process proceeds to step 312; otherwise, the process proceeds to step 314.

At step 312, upon the set of inputs satisfying the set of validation codes of the corresponding predictive computer model, the analytic server may execute the corresponding predictive computer model using the set of inputs in an independent environment to generate output results and return the results. The analytic server may execute the corresponding model in the model execution layer that is separate from the API layer. The analytic server may execute the corresponding model in its independent environment, in the model execution layer, based on the request inputs to generate the output results. For example, the mortality model may execute based on the user age, user heart condition, user smoking status, and output the mortality score.

The analytic server may transmit, by model execution layer of the server, the generated results to the API layer of the server. The API layer of the server may transmit the generated results to the user's electronic device. More specifically, the electronic requests may come in via the API layer, and enter the model container in the model execution layer. After the execution of the model, the results may travel back to the API layer and reach the user's electronic device. The communication between the API layer and the model execution layer may be over the efficient RPC protocol. The results may be eventually displayed on the user's electronic device. For example, the analytic server may display the results in a GUI on the user's electronic device. In some embodiments, the analytic server may transmit the results via an electronic message, such as an email, an SMS (short message service) message, a voice mail, and the like.

Different from the convention methods, where both the API and model execution code reside in the same application, each predictive computer model in the method and system described herein may reside in its own separate, containerized environment in a model execution layer that is separate from the API layer. This per-model containerized architecture may enable efficient resource allocation, per-model dependency management, and unified protocol, as discussed above.

In addition to on-demand (synchronous) prediction requests, the analytic server may support batch requests with each batch containing dozens of prediction requests. As discussed above, the analytic server may put the batch requests in an in-memory data structure store (e.g., REDIS) queue, where the batch requests await execution during off-business hours. During off-business hours, a process may wake up to execute the models of the requests in the order the requests were queued. When each job completes, the analytic server may post the results to the URL initially returned to the user (e.g., original requestor). The analytic server may store the results into another database or email a notification to the user to notify the user that the results are now available.

For example, the analytic server may receive batch requests comprising a plurality of electronic requests with low priority. The analytic server may store the batch requests into a data store as a queue. The analytic server may queue the batch requests based on the time they are received, and/or based on the level of priority. The analytic server may execute a plurality of predictive computer models corresponding to the plurality of electronic requests in the queue during off-business hours. The off-business hours may be the time when the workload of the analytic server is less than a threshold.

At step 314, upon the set of inputs not satisfying the set of validation codes of the corresponding predictive computer model, the analytic server may transmit an electronic message comprising error information regarding the electronic request to the user's electronic device through the API layer. As discussed above, the API layer of the analytic server may perform request input validation and error handling. If the request fails the input validation, the analytic server may return a 400 BAD REQUEST response with helpful, human-readable error messages in the response. The analytic server may also log the unexpected errors arising during a prediction.

Non-Limiting Example

An analytic server receives an electronic request to determine a customer's mortality score. The electronic request includes a set of inputs, such as user age, heart condition, and smoking status. The specification file of the mortality model may specify that the accepted input type for user age is numeric, the range for the user age is from 18 to 60, the accepted input type for heart condition is string with a maximum string length of 150, and the accepted input type of the smoking status is Boolean. The analytic server validates the request inputs by checking whether the inputs satisfying the validation codes of the specification file of the mortality model. The API layer of the analytic server performs the input validation. If the request fails the input validation, the API layer returns an error message immediately. For example, if a user age is 61, the API layer may return a message indicating the user age is beyond the valid age range. If the request passes the input validation, the API layer transmits the request to the predictive model execution layer. Within the predictive model execution layer, the analytic server executes the mortality model and outputs the mortality score. The analytic server further transmits the mortality score from the predictive model execution layer to the API layer. The API layer transmits the mortality score to the user's device.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
receiving, by a server, a plurality of predictive computer models, each predictive computer model comprising a model specification file indicating a set of validation codes comprising at least a required input range and type to execute the predictive computer model;
receiving, by an application programming interface layer of the server, from an electronic device, an electronic request to execute a predictive computer model within the plurality of predictive computer models using a set of inputs;
identifying, by the application programming interface layer of the server, a first predictive computer model corresponding to the received electronic request;
validating, by the server, in the application programming interface layer, the electronic request by verifying that the set of inputs corresponds to the required input range and type in the set of validation codes of the first predictive computer model;
in response to the set of inputs corresponding to the required input range and type in the set of validation codes of the first predictive computer model:

executing, by a model execution layer of the server, the first predictive computer model using the set of inputs to generate output results; and transmitting, by the model execution layer of the server, the generated output results to the application programming interface layer of the server, whereby the application programming interface layer of the server transmits the generated output results to the electronic device.

2. The method of claim 1, further comprising:
in response to the set of inputs not corresponding to the required input range and type in the set of validation codes of the first predictive computer model, transmitting, by the application programming interface layer of the server, an electronic message comprising error information regarding the electronic request to the electronic device.

3. The method of claim 1, further comprising:
receiving, by the server, batch requests comprising a plurality of electronic requests;
storing, by the server, the batch requests into a data store as a queue; and
when a workload of the server is less than a threshold,
executing, by the server, a set of predictive computer models corresponding to the batch requests in the queue.

4. The method of claim 3, further comprising:
assigning, by the server, a uniform resource locator for each of the batch requests; and
updating, by the server, a request status in the uniform resource locator.

5. The method of claim 1, wherein each of the plurality of predictive computer models resides in a separate containerized environment.

6. The method of claim 1, wherein the plurality of predictive computer models are in different programming languages.

7. The method of claim 1, further comprising:
authenticating, by the server, identities of data scientists uploading the plurality of predictive computer models with two-factor authentication.

8. The method of claim 1, wherein the model specification file is generated based on a template.

9. The method of claim 1, wherein the model specification file comprises input schemas, expected output, and description of a service of a predictive computer model.

10. The method of claim 1, wherein communication between the application programming interface layer and the model execution layer is through a unified remote procedure call protocol.

11. A computer system comprising:
an electronic device,
a server in communication with the electronic device and configured to:
receive a plurality of predictive computer models, each predictive computer model comprising a model specification file indicating a set of validation codes comprising at least a required input range and type to execute the predictive computer model;
receive, by an application programming interface layer of the server, from the electronic device, an electronic request to execute a predictive computer model within the plurality of predictive computer models using a set of inputs;
identify, by the application programming interface layer of the server, a first predictive computer model corresponding to the received electronic request;
validate, in the application programming interface layer, the electronic request by verifying that the set of inputs corresponds to the required input range and type in the set of validation codes of the first predictive computer model;
in response to the set of inputs corresponding to the required input range and type in the set of validation codes of the first predictive computer model:
execute, by a model execution layer of the server, the first predictive computer model using the set of inputs to generate output results; and
transmit, by the model execution layer of the server, the generated output results to the application programming interface layer of the server, whereby the application programming interface layer of the server transmits the generated output results to the electronic device.

12. The computer system of claim 11, wherein the server is further configured to:
in response to the set of inputs not corresponding to the required input range and type in the set of validation codes of the first predictive computer model, transmit, by the application programming interface layer of the server, an electronic message comprising error information regarding the electronic request to the electronic device.

13. The computer system of claim 11, wherein the server is further configured to:
receive batch requests comprising a plurality of electronic requests;
store the batch requests into a data store as a queue; and
when a workload of the server is less than a threshold,
execute a set of predictive computer models corresponding to the batch requests in the queue.

14. The computer system of claim 13, wherein the server is further configured to:
assign a uniform resource locator for each of the batch requests; and
update a request status in the uniform resource locator.

15. The computer system of claim 11, wherein each of the plurality of predictive computer models resides in a separate containerized environment.

16. The computer system of claim 11, wherein the plurality of predictive computer models are in different programming languages.

17. The computer system of claim 11, wherein the server is further configured to:
authenticate identities of data scientists uploading the plurality of predictive computer models with two-factor authentication.

18. The computer system of claim 11, wherein the model specification file is generated based on a template.

19. The computer system of claim 11, wherein the model specification file comprises input schemas, expected output, and description of a service of a predictive computer model.

20. The computer system of claim 11, wherein communication between the application programming interface layer and the model execution layer is through a unified remote procedure call protocol.

* * * * *